US008087985B2

(12) United States Patent
Katz

(10) Patent No.: US 8,087,985 B2
(45) Date of Patent: Jan. 3, 2012

(54) LATE BET BACCARAT

(76) Inventor: Marcus A. Katz, Miami Beach, FL (US)

(*) Notice: Subject to any disclaimer, the term of this patent is extended or adjusted under 35 U.S.C. 154(b) by 0 days.

(21) Appl. No.: 12/090,851

(22) PCT Filed: Jul. 3, 2007

(86) PCT No.: PCT/US2007/072792
§ 371 (c)(1),
(2), (4) Date: May 1, 2009

(87) PCT Pub. No.: WO2009/005526
PCT Pub. Date: Jan. 8, 2009

(65) Prior Publication Data

US 2010/0090402 A1 Apr. 15, 2010

(51) Int. Cl.
*A63F 1/00* (2006.01)
*A63F 13/00* (2006.01)

(52) U.S. Cl. ........................... 463/12; 273/292; 273/274

(58) Field of Classification Search .................. 273/292, 273/274, 309; 463/12, 13
See application file for complete search history.

(56) References Cited

U.S. PATENT DOCUMENTS

| | | | | |
|---|---|---|---|---|
| 5,362,064 | A | 11/1994 | Lofink et al. | |
| 5,395,119 | A | 3/1995 | Jacob et al. | |
| 5,669,606 | A | 9/1997 | Brown | |
| 5,758,878 | A | 6/1998 | Brown | |
| 5,876,283 | A | 3/1999 | Parra et al. | |
| 5,957,459 | A | 9/1999 | Chae | |
| 6,065,753 | A | 5/2000 | Morosky | |
| 6,293,864 | B1 | 9/2001 | Romero | |
| 6,598,879 | B2 * | 7/2003 | Spur et al. | 273/292 |
| 6,644,666 | B1 * | 11/2003 | Tamura et al. | 273/292 |
| 6,789,801 | B2 | 9/2004 | Snow | |
| 6,916,245 | B1 | 7/2005 | Vancura et al. | |
| 2002/0006820 | A1 | 1/2002 | Romero | |
| 2003/0011127 | A1 | 1/2003 | Vancura et al. | |
| 2003/0069058 | A1 | 4/2003 | Byrne | |
| 2003/0190941 | A1 | 10/2003 | Byrne | |
| 2004/0053664 | A1 | 3/2004 | Byrne | |
| 2004/0108656 | A1 | 6/2004 | Snow | |
| 2004/0256803 | A1 | 12/2004 | Ko | |

(Continued)

FOREIGN PATENT DOCUMENTS

AU 2003266480 7/2004

(Continued)

OTHER PUBLICATIONS

International Search Report and Written Opinion dated Oct. 3, 2008 for International Application No. PCT/US2007/72792, filed Jul. 3, 2007 (7 pages).

(Continued)

*Primary Examiner* — Benjamin Layno
(74) *Attorney, Agent, or Firm* — Thibault Patent Group

(57) ABSTRACT

Among other things, enabling late bets in a game of Baccarat includes accepting a first bet from one or more participants. Two cards are dealt to each of a player position and a bank position. A player position score and a bank position score are determined based on the two cards dealt to each of the player position and the two cards dealt to the bank position. Based on the determined scores for the player position and the bank position, a determination is made on whether to deal a third card to at least one of the player position and the bank position.

4 Claims, 3 Drawing Sheets

U.S. PATENT DOCUMENTS

| | | | |
|---|---|---|---|
| 2005/0073102 | A1 | 4/2005 | Yoseloff et al. |
| 2005/0127606 | A1 | 6/2005 | Snow et al. |
| 2005/0197183 | A1 | 9/2005 | Walker et al. |
| 2005/0218597 | A1 | 10/2005 | Parsadaian et al. |
| 2005/0221885 | A1 | 10/2005 | Walker et al. |
| 2005/0253337 | A1 | 11/2005 | Whiting |
| 2005/0261973 | A1 | 11/2005 | Van Luchene |
| 2005/0288096 | A1 | 12/2005 | Walker et al. |
| 2006/0001214 | A1 | 1/2006 | Ritzer et al. |
| 2006/0003826 | A1 | 1/2006 | Walker et al. |
| 2006/0003830 | A1 | 1/2006 | Walker et al. |
| 2006/0025207 | A1 | 2/2006 | Walker et al. |
| 2006/0035696 | A1 | 2/2006 | Walker et al. |
| 2006/0103071 | A1 | 5/2006 | Ritzer et al. |
| 2006/0226605 | A1 | 10/2006 | Kenny |
| 2007/0032283 | A1 * | 2/2007 | Chun .............................. 463/12 |
| 2007/0057466 | A1 | 3/2007 | Soltys et al. |
| 2007/0075495 | A1 | 4/2007 | Mostashari |
| 2007/0184889 | A1 | 8/2007 | Walker et al. |
| 2007/0210515 | A1 | 9/2007 | Schubert et al. |
| 2007/0213124 | A1 | 9/2007 | Walker et al. |
| 2007/0276537 | A1 | 11/2007 | Walker et al. |
| 2008/0111300 | A1 | 5/2008 | Czyzewski et al. |
| 2008/0146311 | A1 | 6/2008 | Walker et al. |
| 2008/0201213 | A1 | 8/2008 | Lee et al. |
| 2008/0202889 | A1 | 8/2008 | Breitenbach et al. |
| 2008/0248865 | A1 | 10/2008 | Tedesco et al. |
| 2008/0274798 | A1 | 11/2008 | Walker et al. |
| 2008/0305862 | A1 | 12/2008 | Walker et al. |
| 2008/0318656 | A1 | 12/2008 | Walker et al. |

FOREIGN PATENT DOCUMENTS

| | | |
|---|---|---|
| AU | 2004222759 | 5/2006 |
| CA | 2252864 | 10/1998 |
| WO | WO97/27918 | 8/1997 |
| WO | WO01/36057 | 5/2001 |
| WO | WO2008039835 A2 | 4/2008 |
| WO | WO2008101204 A1 | 8/2008 |

OTHER PUBLICATIONS

PCT Notification of Transmittal of the International Search Report and the Written Opinion of the International Searching Authority, or the Declaration in PCT/US07/72792 dated Oct. 3, 2008.

Examiner's First Report in Australian Patent Application No. 200901475 dated Mar. 2, 2010.

Examination Report in Singapore Patent Application No. 200902352-4 dated Jun. 4, 2010.

PCT Notification of Transmittal of the International Search Report and the Written Opinion of the International Searching Authority, or the Declaration in PCT/US2009/030012 dated Oct. 5, 2009.

File history in U.S. Appl. No. 60/868,470, filed Dec. 4, 2006.

File history in U.S. Appl. No. 60/890,328, filed Feb. 16, 2007.

File history in U.S. Appl. No. 60/943,171, filed Jun. 11, 2007.

File history in U.S. Appl. No. 61/012,230, filed Dec. 7, 2007.

File history in U.S. Appl. No. 61/020,470, filed Jan. 11, 2008.

File history in U.S. Appl. No. 61/023,290, filed Jan. 24, 2008.

File history in U.S. Appl. No. 61/024,827, filed Jan. 30, 2008.

File history in U.S. Appl. No. 61/028,555, filed Feb. 14, 2008.

* cited by examiner

LATE BET BACCARAT

CLAIM OF PRIORITY

This application claims priority under 35 USC §119(b) to PCT Patent Application Serial No. PCT/US2007/72792, filed on Jul. 3, 2007, the entire contents of which are hereby incorporated by reference.

TECHNICAL FIELD

The subject matter described herein relates to techniques for operating a Baccarat game. For example, techniques for implementing late bets in a Baccarat game are disclosed.

BACKGROUND

In general, commercially available versions of the game of Baccarat generally provide game participants a choice of three standard bets per hand: BANK, PLAYER and/or TIE. And while other side bets are sometimes accepted, both standard bets and side bets are accepted by casinos only prior to the beginning of each hand.

SUMMARY

Techniques for implemented late bets in a game of Baccarat are disclosed.

In one aspect, enabling late bets in a game of Baccarat includes accepting a first bet from one or more participants. Two cards are dealt to a player position and a bank position. A player position score and a bank position score are determined based on the two cards dealt to each of the player position and the two cards dealt to the bank position. Based on the determined scores for the player position and the bank position, a determination is made on whether to deal a third card to at least one of the player position, and the bank position.

Implementations can optionally include one or more of the following features. Determining whether to accept one or more late bets from the one or more participants can be based on a policy of a casino or an online betting establishment. Also, determining whether to accept one or more late bets based on the policy can include determining based on real time calculations of a probability of the third card having a value from any one of 0, 1, 2, 3, 4, 5, 6, 7, 8 and 9. One or more late bets can be accepted from the one or more participants before a third card is dealt to the player position when detected that a third card will be dealt to the bank position. Alternatively, one or more late bets from the one or more participants can be accepted when detected that a third card will be dealt to both the player position and the bank position. Also, one or more late bets can be accepted from the one or more participants when detected that the determining whether to deal a third card to the bank position is based on a value of a third card dealt to the player position. Alternatively, one or more late bets can be accepted from the one or more participants before a third card is dealt to the bank position when detected that a third card is to be dealt to the bank position after dealing a third card to the player position. Yet in another case, one or more late bets can be accepted from one or more participants before a third card is dealt to the bank position when detected that a third card is to be dealt to the bank position only. When detected that a third card is to be dealt to both the player position and the bank position one or more late bets can be accepted from one or more participants before dealing a third card to the player position and before dealing a third card to the bank position.

In another aspect, techniques disclosed in this specification is implemented as a computer program product, encoded on a computer-readable medium, designed to cause a data processing apparatus to perform operations including accepting a bet from one or more participants. In addition, the computer program product is designed to cause the data processing apparatus to deal two cards each to a player position and a bank position. calculating a player position score and a bank position score based on the two cards dealt to each of the player position and the bank position. The computer program product is also designed to determine whether to deal a third card to at least one of the player position and the bank position based on the determined scores for the player position and the bank position. The computer program product is also designed to cause a data processing apparatus to determine whether to accept one or more late bets from the one or more participants based on a policy of a casino or an online betting establishment.

Implementations can optionally include one or more of the following features. The computer program product can further be designed to cause a data processing apparatus to determine whether to accept one or more late bets based on the policy that includes real time calculations of a probability of the third card having a value from any one of 0, 1, 2, 3, 4, 5, 6, 7, 8 and 9. When determined that a third card will be dealt to the bank position, the computer program product of claim can also be designed to cause a data processing apparatus to accept one or more late bets from the one or more participants before a third card is dealt to the player position. When determined that a third card will be dealt to both the player position and the bank position, the computer program product of claim can be designed to cause a data processing apparatus to accept one or more late bets from the one or more participants. When detected that the determining whether to deal a third card to the bank position is based on a value of a third card dealt to the player position, the computer program product can be designed to cause a data processing apparatus to accept one or more late bets from the one or more participants. When detected that a third card is to be dealt to the bank position after dealing a third card to the player position, the computer program product can be designed to cause a data processing apparatus to accept one or more late bets from the one or more participants before dealing a third card to the bank position. When detected that a third card is to be dealt to the bank position only, the computer program product can be designed to cause a data processing apparatus to accept one or more late bets from the one or more participants before a third card is dealt to the bank position. When detected that a third card is to be dealt to both the player position and the bank position, the computer program product can be designed to cause a data processing apparatus to accept one or more late bets from the one or more participants before dealing a third card to the player position and before dealing a third card to the bank position.

In another aspect, the techniques disclosed in this specification is implemented as a system that includes a user interface designed to accept a first bet from one or more participants, and a data processing unit communicatively coupled to the user interface. The data processing unit is designed to deal two cards each to a player position and a bank position. The data processing unit is also designed to determine a player position score and a bank position score based on the two cards dealt to each of the player position and the bank position. Further, the data processing unit is further designed to determine whether to deal a third card to at least one of the player position and the bank position based on the determined scores for the player position and the bank position.

Implementations can optionally include one or more of the following features. The data processing unit can be designed to determine whether to accept one or more late bets from the one or more participants based on a policy of a casino or an online betting establishment. Also, the data processing unit can be designed to determine whether to accept one or more late bets from the one or more participants based on the policy that includes real time calculations of a probability of the third card having a value from any one of 0, 1, 2, 3, 4, 5, 6, 7, 8 and 9. Further, the user interface can be designed to accept one or more late bets from the one or more participants before a third card is dealt to the player position when the data processing unit detects that a third card is to be dealt to the bank position. Also, the user interface is can be designed to accept one or more late bets from the one or more participants when the data processing unit detects that a third card is to be dealt to both the player position and the bank position. When the data processing unit detects that the determining whether to deal a third card to the bank position is based on a value of a third card dealt to the player position, the user interface can be designed to accept one or more late bets from the one or more participants. When the data processing unit detects that a third card is to be dealt to the bank position after dealing a third card to the player position, the user interface can be further designed to accept one or more late bets from the one or more participants before dealing a third card to the bank position. When the data processing unit detects that a third card is to be dealt to the bank position only, the user interface can be designed to accept one or more late bets from one or more participants before a third card is dealt to the bank position. When detected that a third card is to be dealt to both the player position and the bank position, the user interface can be designed to accept one or more late bets from one or more participants before dealing a third card to the player position and before dealing a third card to the bank position.

The subject matter of this disclosure can be implemented as computer program products, tangibly embodied in a computer or machine readable medium. Such computer program products may cause a data processing apparatus to conduct one or more operations described herein.

Similarly, systems are also described that may include a processor and a memory coupled to the processor. The memory may encode one or more programs that cause the processor to perform one or more of the method acts described herein.

Further, features described in this specification can be implemented as one or more methods or processes.

The subject matter described herein provides many advantages. For example, the opportunity to place late bets on BANK, PLAYER and TIE based on changing odds can make the game if Baccarat far more challenging and fun for the game participants. In addition, the late bets can provide additional play and revenues for casinos.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
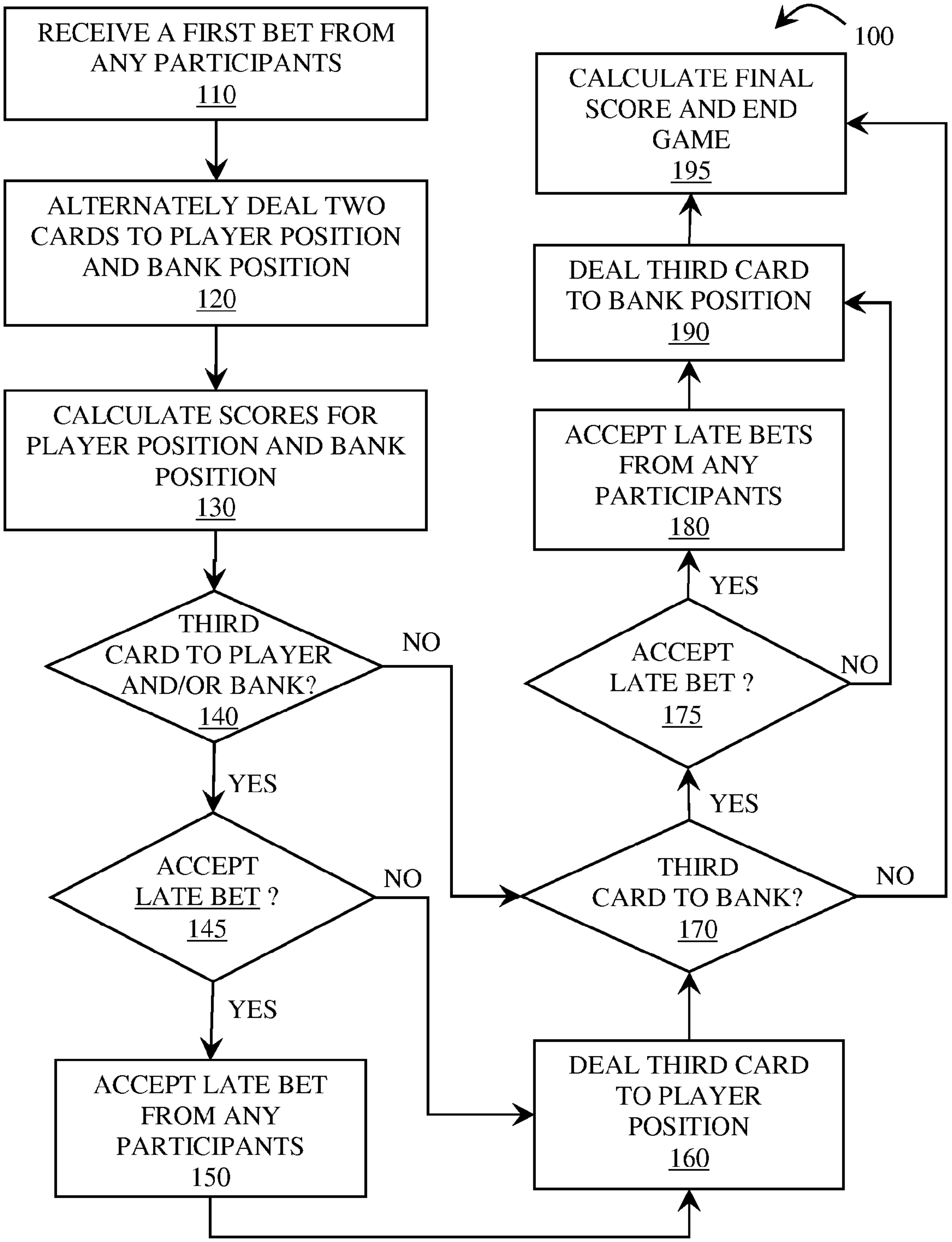
FIG. 1 is process flow diagram of a process for implementing late bets in a game of Baccarat.

Techniques for implementing late bets in a game of Baccarat are disclosed. In contrast to bets that are required to be placed before the beginning of a hand, late bets are based on changing odds of winning as the game progresses.

Baccarat is a simple gambling card game with only three possible results: (1) Player, (2) Bank and (3) TIE. The term Player does not refer to a game participant, and the term Bank does not refer to the house. Player, Bank and TIE are merely names of three betting options from which a game participant can choose.

Baccarat, as played on a table in a casino, is generally played with 8 decks of cards dealt from a container known as a shoe. The shoe facilitates efficient dealing while decreasing the chance of cards being prematurely exposed by the dealer. Baccarat, in its electronic form, as played on-line or by machine in a casino, may use electronic decks of cards and shoes in which shuffles do not occur until the end of the shoe as in table games using real cards. However, in some cases, electronic games may be designed to reshuffle the cards after each hand is played.

Scoring in Baccarat involves the assignment of points corresponding to the face value of each card. The suit and color does not matter in determining the value of each card. Aces are worth 1. Each numbered card less than ten is worth its face value. Tens and face cards are worth 0. Further, the score of a hand is determined by the right digit of the total value of the cards. For example, if the cards dealt are an 8 and a 7 (of any suit or color), the total value is 15 but the score for the hand would be 5. If the cards dealt are an 8, 7 and a 6, the total value is 21 but the score would be 1. The scores always range from 0 to 9, and it is impossible to bust as in the game of blackjack. The winning hand is determined by identifying the hand with a score closest to 9 at the end. Matching scores at the end are considered a TIE. In case of a TIE, bets on TIE win and bets on the Bank and Player positions are returned.

Baccarat is a game that tends to attract high stakes because (with the exception of the TIE bet) the game provides extremely close odds, as can be seen in Table 1 below.

TABLE 1

Traditional Baccarat Bets

| | | Calculating Odds | Net Odds |
|---|---|---|---|
| Bet on Bank (Pays 1-1 less 5% commission) | Winning Hand | 50.68% × 0.95 | 48.15% |
| 1-1 is verbally spoken as 1 to 1 | Losing Hand | 49.32% × 1.00 | 49.32% |
| | House Edge | | 1.17% |
| Bet on Player (Pays 1-1 with no commission) | Winning Hand | 49.32% × 1.00 | 49.32% |
| | Losing Hand | 50.68% × 1.00 | 50.68% |
| | House Edge | | 1.36% |
| Bet on TIE (Pays 8-1 with no commission) | Winning Hand | 9.54% × 8.00 | 76.32% |
| 8-1 is oftentimes described as 9 for 1 | Losing Hand | 90.46% × 1.00 | 90.46% |
| | House Edge | | 14.14% |

Traditionally, the bets on BANK, PLAYER and TIE are placed by game participants prior to the beginning of each hand. In some instances, various supplemental bets may be allowed by some casinos, but in all cases, these early bets are placed when the odds of winning or losing, as described in Table 1, are static since no cards have been dealt yet. Late bets, as described in this specification, are based on the changing odds of winning as the hand progresses. The opportunity to place late bets on BANK, PLAYER and TIE based on changing odds can make the game of Baccarat far more challenging and fun for the game participants, while simultaneously producing additional play and revenues for casinos. These late bets could be placed without respect to (1) whether the game participant had placed a bet prior to the beginning of the hand and (2) without respect to whether a game participant's first bet was on BANK or PLAYER and/or TIE and/or any side bet allowed.

FIG. 1 is a process flow diagram showing a process 100 for implementing late bets in a game of Baccarat. A traditional game of Baccarat starts with one or more participants placing a traditional bet (e.g., bet on Player position, bet on Bank position or bet on TIE prior to the start of the hand.) This first bet is received from one or more of the participants at 110. A dealer alternately deals two cards to a Player position and another two cards to a Bank position at 120. A score is determined, according to the rules of Baccarat as described above, for the Player position and the Bank position at 130. At 140, a determination is made whether a third card should be dealt to the Player position and/or the Bank position by considering the following:

Player and Bank positions both stand, or

Player position stands, Bank position draws third card, or

Bank position stands, Player position draws third card, or

Player and Bank positions both draw a third card or

Player position draws third card, Bank position sometimes draws third card.

The determination at 140 above is made using the following standard Baccarat drawing rules:

1. If either the Player position or the Bank position has a total of an 8 or 9, each position stands and the hand is over. This rule overrides all other rules.

2. If both the Player position and the Bank position have a total of 6 or 7, each position stands and the hand is over. This rule overrides the rules below.

3. The Player position always stands on a 6 or 7 and draws on 0-5.

4. The Bank position always stands on a total of 7, draws on 0-5 if the Player position stands, but if the Player position is not going to stand, is guaranteed a draw on 0-2 only.

5. In cases in which the Player position is not going to stand and the Bank position has a total of 3 to 6, the determination on whether the Bank position does or does not receive a third card is based on the value of the third card received by the Player position.

In these cases the Bank position draws a third card if the Bank position's starting total is (a) 3 and the Player position's third card is an A-7, 9 or 0 value card (any card but an 8)

(b) 4 and the Player position's third card is a 2-7

(c) 5 and the Player position's third card is a 4-7

(d) 6 and the Player position's third card is a 6-7

When the determination at 140 is that a third card should be dealt to the Player position, another determination is made at 145 to decide whether to accept Late bets (e.g., based on established policy of the casino or the online gaming site). When the determination at 145 is to accept late bets, all participants, may be allowed to place a late bet at 150 prior to the receipt of the Player's third card at 160. When required, based on the standard Baccarat drawing rules described above, the third card is dealt to the Player position at 160.

After the third card is dealt to the Player position, if the determination was not made at 140 to definitely or definitely not deal a card to the Bank position, then a determination may be required at 170 to decide whether to deal a third card to the Bank Position. In this case, the determination on whether or not a third card will be dealt to the Bank position is dependent upon the value of the third card drawn by the Player position (see, standard Baccarat drawing rules above). When the determination at either 140 or 170 is that a third card should be dealt to the Bank position, then another determination is made at 175 to decide whether late bets are accepted (e.g., based on established policy of the casino or online gaming site). When determined that late bets are accepted at 175, all participants may be allowed to place a late bet at 180 prior to dealing a third card to the Bank position at 190. The third card is dealt to the Bank position at 195 when required (e.g., based on standard Baccarat drawing rules).

When the determination at 140 is that a third card should not be dealt to the Player position, then a determination is made at 140 to decide whether a third card should be dealt to Banker position. When the determination at 140 is to deal the third card to Bank position, the process 100 moves to 175 to determine if late bets should be accepted from any participants, based on the established policy of the casino or the online gaming site, before dealing the third card to the Bank position at 190. When the determination at 175 is that late bets are not accepted (e.g., based on established policy of the casino or the online gaming site), the process 100 moves to deal the third card to the Bank position at 190 without accepting any late bets. Then, the final score is determined and the game ends at 195. When the determination at 170 is that a third card is not to be dealt to the Bank position (which may be independent of whether a third card was dealt to the Player position), the process 100 moves to determine the final score and the game ends at 195 without dealing third card to the Bank position or accepting late bets. When the determination at 145 is that late bets are not accepted (e.g., based on established policy of the casino or the online gaming site), the process 100 also moves to deal a third card to the Player position without accepting any late bets.

In cases in which both the Bank and Player positions receive a third card (e.g., by the process 100 performing 140, 145, 150, 160, 170, 175, 180, 190 and 195), a total of two late bets may be accepted from each participant—one at 145 and another at 175. Since accepting the late bets at 145 and 175 may depend on the established policy of the casino or the online gaming site, the game can end at 195 with one, two or zero rounds of late bets being accepted. As previously noted, no late bets based on changing odds are allowed in traditional Baccarat.

Assume, for example, that after the first two cards are dealt to each position, the Player position trails the Bank position by a score of 7 to 2. In this particular case, the rules of Baccarat entitle the Player position to receive a third card. Here, each casino would have the option of accepting a late bet from any participant at 150 (before the third card is dealt to the Player position at 160). The odds offered to participants by the casino on this late bet would be determined by the casino based on the then current odds of a Tie hand occurring, or a win by the Bank and Player positions. In this particular case, the Bank position would be favored to win by approximately 5 to 1 (without taking into consideration the effect of the specific cards previously removed from the shoe). In this example, a casino would have pre-established and published a written policy in regard to offering late bets on TIE, the Bank position or Player position at odds that will ensure the casino will maintain an edge, or the casino may have pre-established and published a written policy not to accept a late bet on this particular play (or any other play).

In the example above, if the casino had established a written policy to accept late bets on this particular play (Player 2, Bank 7), all game participants would be entitled to place a late bet at the odds determined by the casino, which, in the case of a table game, would be based on combination of the current score and the particular cards that had already been removed from the shoe. However, in an electronic game in which the cards are reshuffled prior to each hand, it's likely that the odds would be determined solely by the score. For example, a table game participant who originally bet $1,000 on Player position who believes that he is going to lose the original wager on a bet on the Player position, might decide to place a $5,000 late bet on the Bank position. In this case, if the Bank Position holds on to win and assuming the late bet odds offered by the casino on the Bank position were 1-5, the game participant wins $950 ($1,000 less $50 commission) on the late bet, which will cover most of the loss related to the initial bet on Player Position. However, if Player Position were to draw (on the third card dealt) a 6 or 7, the game participant who made the original bet on the Player position and the late bet on the Bank position, would end up $4,000 worse off by winning the original $1,000 bet on the Player position but losing the late bet of $5,000 on the Bank position.

In the late bet example above, a game participant who originally bet $1,000 on the Bank position might decide to hedge that initial bet by making a late bet of $500 on the Player position. In this case, if the Bank position holds on for a win, the game participant's net win will be $450 (a $1,000 win on the initial bet on the Bank position less $50 (5% commission) less the $500 loss on the late bet made on the Player position. However, if the Player position should pull out the win by drawing a 6 or 7, the game participant still wins a net of $1,500 ($2,500 win [assuming the odds offered by the casino were 5-1] on the late bet on the Player position less the $1,000 loss on the initial bet on the Bank position). Without the hedge bet this game participant would have lost the entire initial bet of $1,000.

In the same late bet example discussed above, a game participant might decide to make a late bet on TIE. In this case, prior to when the third card is dealt to the Player position, the approximate odds against a tie (without taking into consideration the effect of the specific cards previously removed from the shoe) would be 11-1 as opposed to only 8-1 if the TIE bet had been placed prior to the beginning of the hand (i.e., initial bet). In this case the casino might choose to offer odds of 11 for 1 (10 to 1).

The late bet example discussed above in which the Player position trails the Bank position by a score of 7-2 after the first two cards have been dealt is just one of many described above. The standard baccarat drawing rules (e.g., Nos. 3-5), all of which could, depending upon the policies established by the casino, provide similar opportunities for game participants to place a new bet on either the Player position or the Bank position, increase their original bet, hedge their original bet by changing sides or make a new or additional bet on Tie. As described, each of the late bet examples in a table game would offer odds based on a combination of the current score and the cards that have already played during the shoe. But as discussed above, in an electronic game in which the cards are reshuffled prior to each hand, it's likely that the odds would be determined solely by the score. In either case, table or electronic, these late bet opportunities would be a first for the game of Baccarat.

Figure 2A:
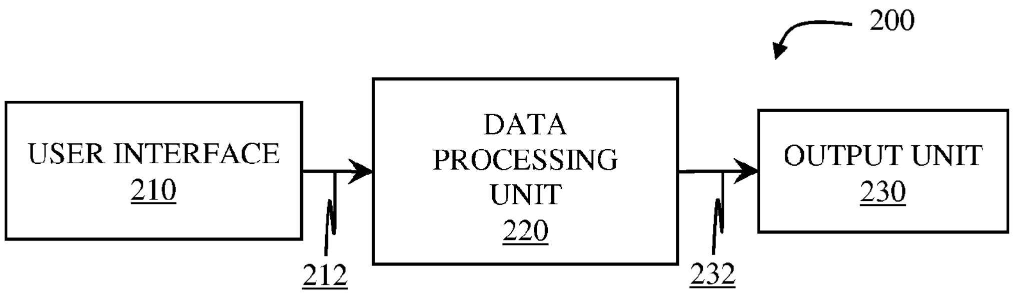
FIG. 2A is a block diagram of a system for implementing late bets in a game of Baccarat.

FIG. 2A is a block diagram of a system 200 for implementing the late bets in a game of Baccarat. The system 200 includes a user interface unit 210, a data processing unit 220 and an output unit 230. The user interface 210 is communicatively coupled to the data processing unit through a communication link 212. Likewise, the output unit 230 is communicatively coupled to the data processing unit 220 through a communication link 232.

The communication links 212 and 232 can provide either unidirectional or bidirectional communications, and can be combined into a single, shared communication channel (e.g., a bus network). The communication links 212 and 232 can be implemented using a wired protocol, such as Universal Serial Bus (USB), FireWire, or other suitable connections. Alternatively, the communication links 212 and 232 can be implemented using a wireless protocol, such as Bluetooth, WiFi, WiMax, etc.

Figure 2B:
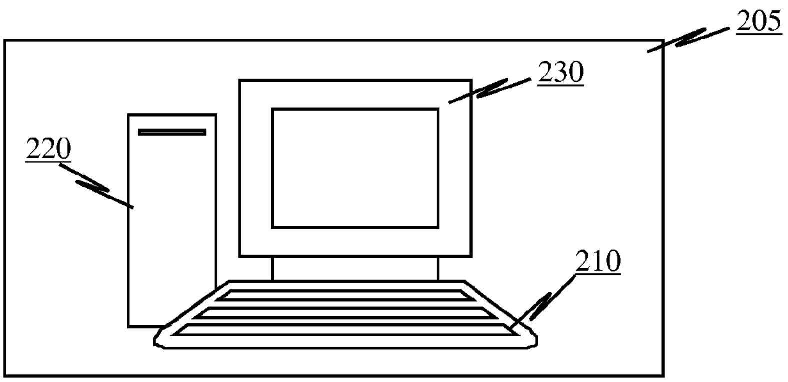
FIG. 2B is a block diagram of a stand alone system for implementing late bets in a game of Baccarat.

As shown in FIG. 2B, the system 200 can be implemented using a stand alone computer system 205. The computer system can include the output unit 230, the user interface device unit 210 and the data processing unit 220. The computer system 210 can include at least a processor 212 and a memory 214. The processor data processing unit 230 can include a central processing unit (CPU), or other suitable processor/hardware such as an application specific integrated circuit (ASIC). The computer system 205 can optionally include other computer components such as a memory unit (not shown) can be a volatile or non-volatile memory unit used to store and execute computer executable instructions. The output unit 230 can include a liquid crystal display (LCD) or other suitable display devices. The computer system 205 can be implemented as a stand alone gaming machine, for example, such as a video poker machine prevalent in a casino.

Figure 2C:
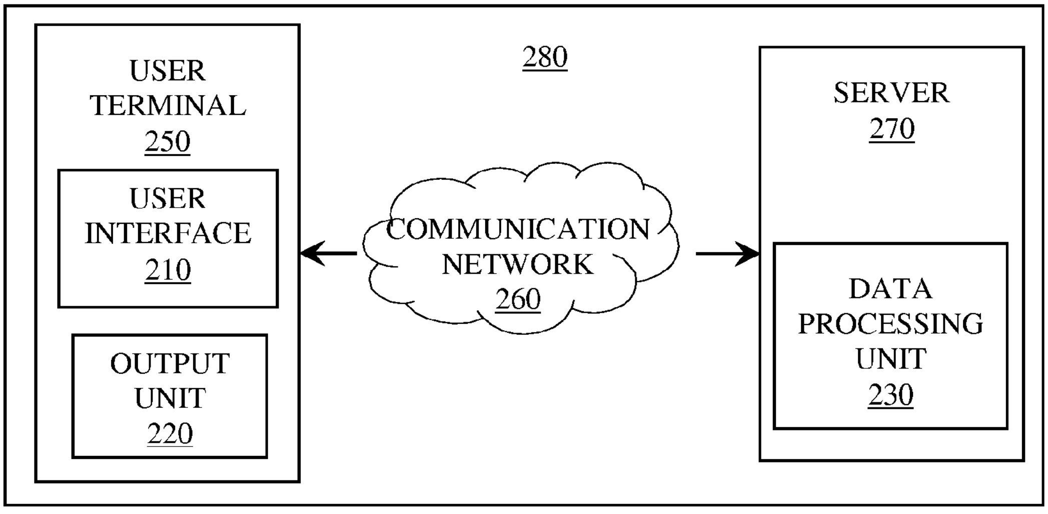
FIG. 2C is a block diagram of a network system for implementing late bets in a game of Baccarat.

In some implementations, the system 200 can be implemented as a network system 280 as shown in FIG. 2C. The network system 280 includes a user terminal 250 communicatively coupled to a server 270 over a communication network 260. The communication network can include the internet, local area network (LAN), wide area network (WAN), WiFi, WiMax, etc. The user terminal 250 can include the user interface unit 210 and the output unit 230. The server 270 can include the data processing unit 220. The network system 280 can be implemented as an online Baccarat game, where a remote user interfacing with a user terminal 250 (e.g., a personal computer) communicates with the server 270. The online Baccarat game is managed and executed by the data processing unit 230.

In a casino Baccarat game using actual playing cards, the data processing unit 230 can be used by the casino to determine the odds for placing late bets as described above. Alternatively, in a casino Baccarat game machine (e.g., similar to a video poker machine) or an online Baccarat game, the user interface unit 210 is used to receive bets placed by the game participant in addition to any other user interactions. The data processing unit 230 manages one or more computer programs that when executed cause the Baccarat game machine (data processing device) to perform various functions, such as (1) dealing the cards to the Player Position and the Bank Position; (2) determine scores for both positions; (3) determine whether a third card should be dealt to the Player Position and/or the Bank; (4) determine odds (probabilities) for late bets in real-time; (5) determine whether late bets should be received from the game participant Position; (6) determine the final scores for both positions; and (7) determine the winners.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "information carrier" comprises a "machine-readable medium" that includes any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal, as well as a propagated machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although a few variations have been described in detail above, other modifications are possible. For example, the logic flow depicted in the accompanying figures and described herein does not require the particular order shown, or sequential order, to achieve desirable results.

Figure 3A:
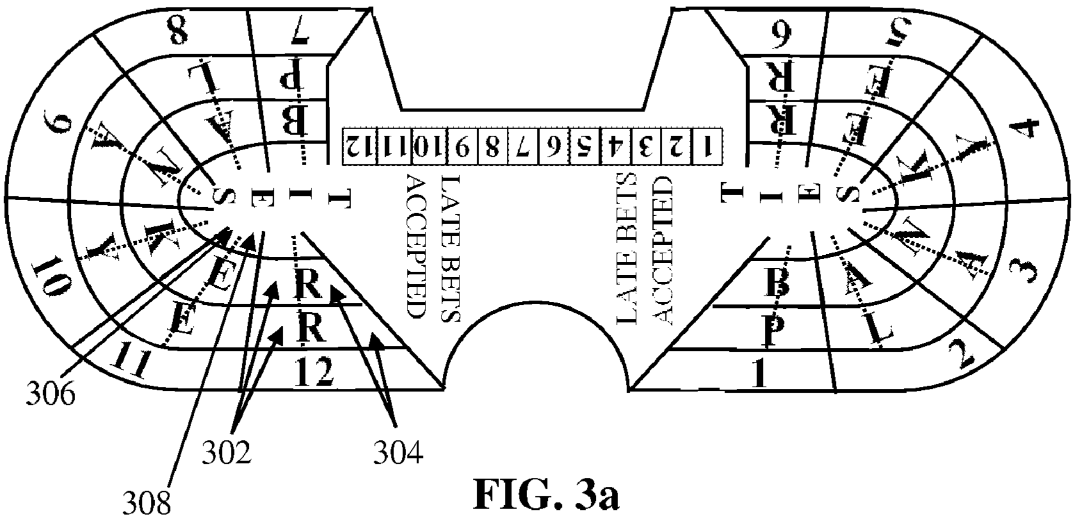
FIGS. 3A and 3B are top down views of modified Baccarat Tables.
Figure 3B:
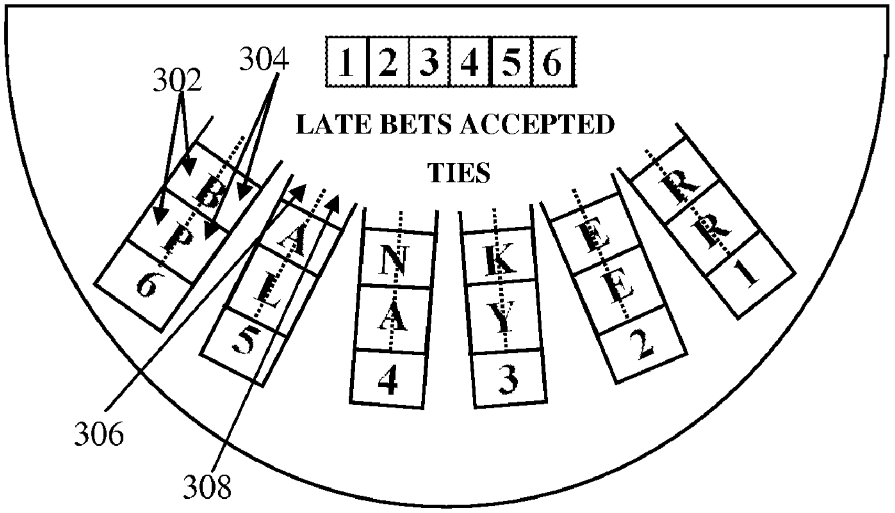

In particular, the Baccarat game table layouts could be slightly altered to accommodate late bet opportunities or late bets could be accommodated on existing table layouts by the casino's designation of a spot on the table for those bets. FIGS. 3*a* and 3*b* are example diagrams of a Baccarat game table layout that shows how late bets may be accommodated. FIG. 3*a* illustrates a BIG BACCARAT table and FIG. 3*b* illustrates a MINI BACCARAT table. Initial bets on the Bank and Player positions could be placed to the left 302 of the letter appearing in the game participants' betting spots and late bets to the right 304 of the same letter. For bets on TIE, initial bets could be placed on the left 306 of the space traditionally used for TIE bets, and late bets place on the right 308 of the same space. The difference between a BIG BACCARAT table and a MINI BACCARAT table is that the MINI BACCARAT table is set up like a blackjack table with a single dealer on one side of the table and game participants on the other side.

Also, while it would be theoretically possible for a casino to allow late bets prior to each draw during the hand, live table games require the casino to consider the practicality of being able to offer bets that are convenient to place, track and pay off at the table. Accordingly, late bets prior to every possible draw would likely, but not necessarily, be limited to electronic or on-line versions of Baccarat.

At live table games in a casino, the implementations described may be limited to late bets on the final draw of the hand. In such implementations, casinos may choose to develop rules and procedures that will allow them to offer certain late bets without the utilizing technology to determine the changing odds in real-time.

In the examples of late bets described above, the actual odds offered to the game participant by the casino could be adjusted based on the casino's preferences, but the examples chosen illustrate the attractiveness and simplicity of the late bet concept from both the casino's and the game participant's point of view.

What is claimed is:

1. A method of hosting a modified game of baccarat, the modified game of baccarat comprising a player position in competition with a bank position, the player position and the bank position receiving physical playing cards from a deck of 52 physical deck of playing cards, the method comprising:

detecting placement of an initial bet from one or more participants by a user interface, the initial bet relating to the player position beating the bank position at the conclusion of a round of game play, a bank position beating the player position at the conclusion of the round of game play, or a tie between the player position and the bank position at the conclusion of the round of game play;

providing two of the 52 physical playing cards each to the player position and the bank position;

determining a value of each physical playing card provided during the round of play by an electronic card reader;

calculating a player position score by a processor based on a total value of the two physical playing cards provided to the player position and a bank position score based on a total value of the two physical playing cards dealt to the bank position;

determining whether an additional physical playing card will be provided to the player position by the processor based on the player position score and the bank position score, in accordance with the rules of baccarat; and detecting placement of a second bet from one or more of the participants by the user interface, the second bet relating to the player position beating the bank position at the conclusion of the round of game play, the bank position beating the player position at the conclusion of the round of game play, or a tie between the player position and the bank position at the conclusion of the round of game play, the second bet allowed if it was determined that the player position is to receive an additional card, wherein the second bet may be placed by any of the one or more participants regardless of the participant's initial bet.

2. The method of claim 1, further comprising:

dealing a first additional physical playing card to the player position;

calculating a new player position score by the processor based on the total value of the first additional card and the two physical playing cards provided to the player position;

determining whether a second additional card will be dealt to the bank position by the processor based on the new player position score and the bank position score; and detecting placement of a third bet from one or more of the participants by the user interface, the third bet relating to the player position beating the bank position at the conclusion of the round of game play, the bank position beating the player position at the conclusion of the round of game play, or a tie between the player position and the bank position at the conclusion of the round of game play, the third bet allowed if the processor determined that the bank position is to receive the second additional card, wherein the third bet may be placed by any of the one or more participants regardless of the participant's initial bet.

3. The method of claim 1, further comprising:

determining whether a second additional card will be dealt to the bank position by the processor, based on the player position score and the bank position score; and detecting placement of a third bet from one or more of the participants by the user interface, the third bet relating to the player position beating the bank position at the conclusion of the round of game play, the bank position beating the player position at the conclusion of the round of game play, or a tie between the player position and the bank position at the conclusion of the round of game play, the third bet allowed if the processor determined that the player position is not to receive the additional card and the bank position is determined to receive the second additional card, wherein the third bet may be placed by any of the one or more participants regardless of the participant's initial bet.

4. The method of claim 1, further comprising:

calculating a set of odds relating whether the player position will beat the bank position at the conclusion of the round of game play, whether the bank position will beat the player position at the conclusion of the round of game play, or whether a tie will occur between the player position and the bank position at the conclusion of the round of game play by the processor after the two physical playing cards each have been provided to the player position and the bank position; and displaying the set of odds to the one or more participants using an electronic display device.

* * * * *